(12) United States Patent
Li et al.

(10) Patent No.: US 10,442,443 B1
(45) Date of Patent: Oct. 15, 2019

(54) PROVIDING DRIVER FEEDBACK (71) Applicant: GM Global Technology Operations LLC, Detroit, MI (US)

(72) Inventors: Shifang Li, Shelby Township, MI (US); Donald K. Grimm, Utica, MI (US); Yuchen Zhou, Troy, MI (US); Brent N. Bacchus, Sterling Heights, MI (US); Lawrence A. Bush, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/975,107

(22) Filed: May 9, 2018

(51) Int. Cl.
| | |
|---|---|
| *B60W 50/14* | (2012.01) |
| *B60W 30/09* | (2012.01) |
| *B60W 10/00* | (2006.01) |
| *B60W 40/00* | (2006.01) |
| *B60W 50/10* | (2012.01) |
| *B60W 50/08* | (2012.01) |

(52) U.S. Cl.
CPC .......... *B60W 50/14* (2013.01); *B60W 30/09* (2013.01); *B60W 50/087* (2013.01); *B60W 50/10* (2013.01); *B60W 2050/146* (2013.01); *B60W 2520/105* (2013.01); *B60W 2540/18* (2013.01)

(58) Field of Classification Search
None
See application file for complete search history.

(56) References Cited

U.S. PATENT DOCUMENTS

| | | | |
|---|---|---|---|
| 2018/0164808 A1* | 6/2018 | Prokhorov | B60W 50/08 |
| 2018/0281812 A1* | 10/2018 | Tochioka | B60W 40/09 |
| 2018/0319402 A1* | 11/2018 | Mills | B60W 10/04 |

* cited by examiner

Primary Examiner — John F Mortell
(74) Attorney, Agent, or Firm — Cantor Colburn LLP (57) ABSTRACT

Technical solutions are described for providing a driver performance feedback to a driver of a vehicle. An example method includes receiving, by a controller, a first maneuver control from an automated driving system of the vehicle. The method further includes receiving, by the controller, a second maneuver control from the driver. The method further includes, in response to the first maneuver control being different from the second maneuver control, generating a driver notification that is indicative of the first maneuver control from the automated driving system, and operating the vehicle using the second maneuver control.

17 Claims, 6 Drawing Sheets

PROVIDING DRIVER FEEDBACK

INTRODUCTION

The subject disclosure generally relates to providing driver feedback, particularly in a dynamic manner, while driving a vehicle, and particularly based on an automated driving system.

Vehicles can be equipped with an automated driving system that can operate in various operational modes. For example, in a "fully-automated" operational mode (sometimes referred to as Level 5 automation by National Highway Transportation Safety Agency (NHTSA)) a computing system is used to navigate and/or maneuver the vehicle along a travel route with no input from a human driver. In a "semi-automated" operational mode (Level 3 automation per NHTSA), the vehicle can perform full self-driving functions, but may need human intervention in various situations or may request the driver to take control (with some amount of delay allowed in the response). There are various other operational modes that facilitate functions like anti-lock brakes, electronic stability control, lane-keeping and the like. Further, in one or more operational modes, multiple functions are combined, such as the combination of adaptive cruise control and lane-keeping to make a car that drives itself but needs constant human monitoring and quick intervention; or self-park monitored from outside the vehicle. To facilitate such automated functions the vehicles are equipped with sensors that are configured to detect information about the surrounding environment, including the presence of objects in the environment. The detected information can be sent to the computing system.

Typically, new/inexperienced drivers, and/or reckless/bad drivers cause vehicle accidents. It is desirable to train such drivers to mitigate risks of accidents. The technical solutions described herein facilitate an automated driving system to dynamically provide driver feedback for driver performance improvement.

SUMMARY

Technical solutions are described for providing a driver performance feedback to a driver of a vehicle. An example method includes receiving, by a controller, a first maneuver control from an automated driving system of the vehicle. The method further includes receiving, by the controller, a second maneuver control from the driver. The method further includes, in response to the first maneuver control being different from the second maneuver control, generating a driver notification that is indicative of the first maneuver control from the automated driving system, and operating the vehicle using the second maneuver control.

In one or more examples, the first maneuver control is different from the second maneuver control if a difference between a first vehicle speed from the first maneuver control and a second vehicle speed from the second maneuver control exceeds a predetermined threshold. Alternatively, or in addition, the first maneuver control is different from the second maneuver control if a difference between a first vehicle acceleration from the first maneuver control and a second vehicle acceleration from the second maneuver control exceeds a predetermined threshold. Alternatively, or in addition, the first maneuver control is different from the second maneuver control if a difference between a first vehicle steering-direction from the first maneuver control and a second vehicle steering-direction from the second maneuver control exceeds a predetermined threshold.

In one or more examples, a set of deviation metrics is computed by determining differences between one or more parameters from the first maneuver control and the one or more parameters from the second maneuver control, and the driver notification is generated based on the deviation metrics. Further, a driver performance score is computed for the driver wherein the driver performance score is computed as $$\text{score} = \sum_{i=1}^{n} w_i x_i,$$

where $x_i$ is an $i^{th}$ deviation metric from the set of deviation metrics, $w_i$ is a weight associated with the $i^{th}$ deviation metric, and n is a total number of deviation metrics.

In one or more examples, it is determined whether the second maneuver control creates a hazardous situation based on a predetermined set of parameters, and in response to the hazardous situation being created, the vehicle is operated according to the first maneuver control that is received from the automated driving system. Further, the automated driving system is updated based on the second maneuver control that is received from the driver.

According to one or more embodiments a system includes an automated driving system, a driver vehicle interface system, and a controller coupled with the driver vehicle interface system and the automated driving system. The controller provides driver performance feedback for a driver of a vehicle. Providing the driver performance feedback includes receiving a first maneuver control from an automated driving system of the vehicle. Further, the controller receives a second maneuver control from the driver. The controller, in response to the first maneuver control being different from the second maneuver control, generates a driver notification that is indicative of the first maneuver control from the automated driving system and operates the vehicle using the second maneuver control.

In one or more examples, the first maneuver control is different from the second maneuver control if a difference between a first vehicle speed from the first maneuver control and a second vehicle speed from the second maneuver control exceeds a predetermined threshold. Alternatively, or in addition, the first maneuver control is different from the second maneuver control if a difference between a first vehicle acceleration from the first maneuver control and a second vehicle acceleration from the second maneuver control exceeds a predetermined threshold. Alternatively, or in addition, the first maneuver control is different from the second maneuver control if a difference between a first vehicle steering-direction from the first maneuver control and a second vehicle steering-direction from the second maneuver control exceeds a predetermined threshold.

In one or more examples, a set of deviation metrics is computed by determining differences between one or more parameters from the first maneuver control and the one or more parameters from the second maneuver control, and the driver notification is generated based on the deviation metrics. Further, a driver performance score is computed for the driver wherein the driver performance score is computed as $$\text{score} = \sum_{i=1}^{n} w_i x_i,$$

where $x_i$ is an $i^{th}$ deviation metric from the set of deviation metrics, $w_i$ is a weight associated with the $i^{th}$ deviation metric, and n is a total number of deviation metrics.

In one or more examples, it is determined whether the second maneuver control creates a hazardous situation based on a predetermined set of parameters, and in response to the hazardous situation being created, the vehicle is operated according to the first maneuver control that is received from the automated driving system. Further, the automated driving system is updated based on the second maneuver control that is received from the driver.

According to one or more embodiments, a computer program product includes a computer readable storage device comprising one or more computer executable instructions, which, when executed by a controller cause the controller to provide driver performance feedback for a driver of a vehicle. Providing the driver performance feedback includes receiving a first maneuver control from an automated driving system of the vehicle. Further, the controller receives a second maneuver control from the driver. The controller, in response to the first maneuver control being different from the second maneuver control, generates a driver notification that is indicative of the first maneuver control from the automated driving system and operates the vehicle using the second maneuver control.

In one or more examples, the first maneuver control is different from the second maneuver control if a difference between a first vehicle speed from the first maneuver control and a second vehicle speed from the second maneuver control exceeds a predetermined threshold. Alternatively, or in addition, the first maneuver control is different from the second maneuver control if a difference between a first vehicle acceleration from the first maneuver control and a second vehicle acceleration from the second maneuver control exceeds a predetermined threshold. Alternatively, or in addition, the first maneuver control is different from the second maneuver control if a difference between a first vehicle steering-direction from the first maneuver control and a second vehicle steering-direction from the second maneuver control exceeds a predetermined threshold.

In one or more examples, a set of deviation metrics is computed by determining differences between one or more parameters from the first maneuver control and the one or more parameters from the second maneuver control, and the driver notification is generated based on the deviation metrics. Further, a driver performance score is computed for the driver wherein the driver performance score is computed as $$\text{score} = \sum_{i=1}^{n} w_i x_i,$$

where $x_i$ is an $i^{th}$ deviation metric from the set of deviation metrics, $w_i$ is a weight associated with the $i^{th}$ deviation metric, and n is a total number of deviation metrics.

In one or more examples, it is determined whether the second maneuver control creates a hazardous situation based on a predetermined set of parameters, and in response to the hazardous situation being created, the vehicle is operated according to the first maneuver control that is received from the automated driving system. Further, the automated driving system is updated based on the second maneuver control that is received from the driver.

The above features and advantages, and other features and advantages of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Generally, automated driving systems provide at least some aspects of a safety-critical control function (e.g., steering, throttle, or braking occur without direct driver input). In one or more examples, the automated driving system provides safety warnings to drivers but does not perform a control function. The automated driving system may use on-board sensors, cameras, a global positioning system (GPS), and telecommunications to obtain environment information in order to make judgments regarding safety-critical situations and operate/warn appropriately by effectuating control at some automation level.

Vehicle automation has been classified by the Society of Automotive Engineers International (SAE) to range from no automation through full automation in SAE J3016™—classification of driving automation levels in on-road motor vehicles. In general, SAE J3016™ levels and definitions include Level 0—No Automation: The full-time performance by the human driver of all aspects of the dynamic driving task, even when enhanced by warning or intervention systems; Level 1—Driver Assistance: The driving mode-specific execution by a driver assistance system of either steering or acceleration/deceleration using information about the driving environment and with the expectation that the human driver performs all remaining aspects of the dynamic driving task; Level 2—Partial Automation: The driving mode-specific execution by one or more driver assistance systems of both steering and acceleration/deceleration using information about the driving environment and with the expectation that the human driver performs all remaining aspects of the dynamic driving task; Level 3—Conditional Automation: The driving mode-specific performance by an Automated Driving System of all aspects of the dynamic driving task with the expectation that the human driver will respond appropriately to a request to intervene; Level 4—High Automation: The driving mode-specific performance by an Automated Driving System of all aspects of the dynamic driving task, even if a human driver does not respond appropriately to a request to intervene; and Level 5—Full Automation: The full-time performance by an Automated Driving System of all aspects of the dynamic driving task under all roadway and environmental conditions that can be managed by a human driver.

Figure 1:
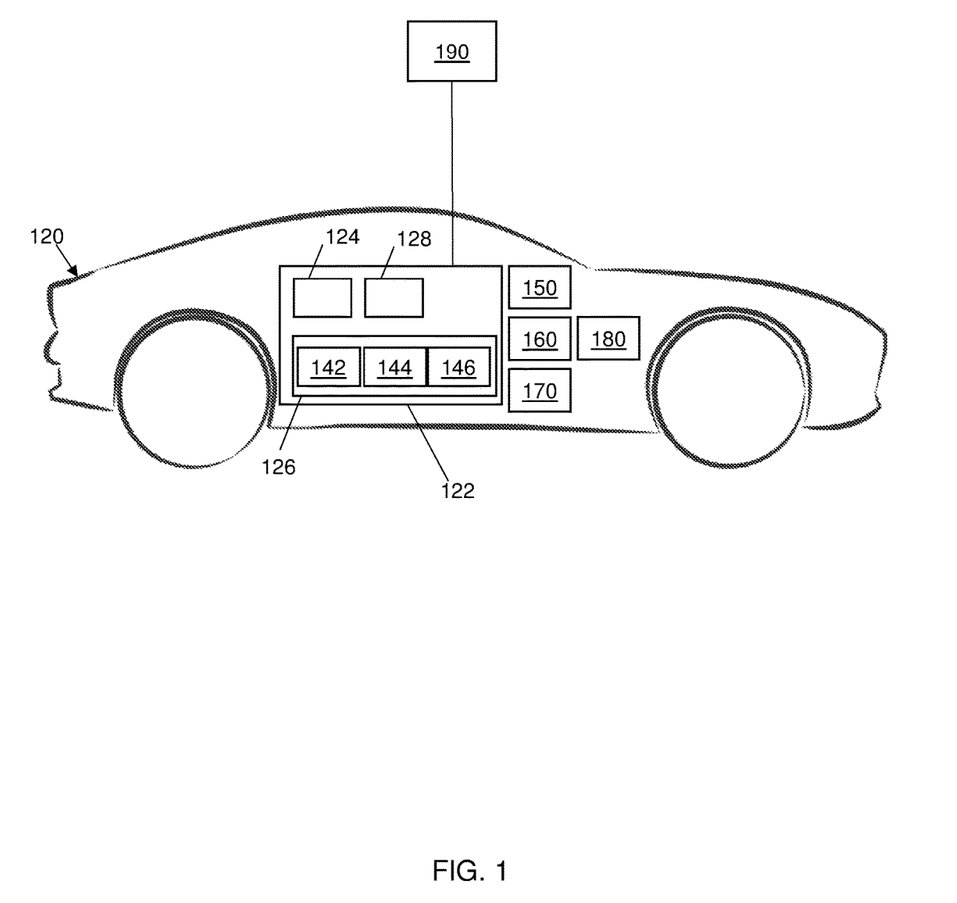
FIG. 1 illustrates a vehicle with an automated driving system according to one or more embodiments.

Referring now to FIG. 1, a vehicle is depicted according to one or more embodiments. FIG. 1 schematically illustrates a vehicle 120 with an automated driving system 122. The automated driving system 122 generally includes a sensor system 124, a control system 126 and a communication system 128. It should be appreciated that although particular systems are separately defined, each or any of the systems may be otherwise combined or segregated via hardware and/or software.

The sensor system 124 may include various sensors operable to identify a condition associated with and around the vehicle 120. In one or more examples, the sensor system 124 includes a surrounding monitor system that includes but is not limited to sensors such as imagery sensors, RADAR, SONAR, LIDAR, and others. It should be appreciated that various sensors may alternatively or additionally be provided.

The control system 126 generally includes a processor 142, a memory 144, and an interface 146. The control system 126 may be a portion of a central vehicle control, a stand-alone unit, or another system such as a cloud-based system. The processor 142 may be any type of microprocessor having desired performance characteristics, and the memory 144 may include any type of computer readable medium that stores the data and control algorithms described herein. The interface 146 facilitates communication with other systems such as the sensor system 124, the communication system 128, and safety-critical control systems such as a braking system 150, a steering system 160, and a throttle system 170 to provide driving/maneuver control for the vehicle 120 based on one or more control algorithms.

In one or more examples, the driver may interact with the control system 126 through a driver vehicle interface (DVI) 180. The DVI 180 may include an instrument panel with a touch screen, keypad, display device, or other interface units. The DVI 180 may also include one or more haptic devices embedded in a steering wheel, a gas pedal, a brake pedal, a gear shifter, a seat assembly, and/or other vehicle control interfaces. The DVI 180 can further include one or more audio devices such as speakers. It should be appreciated that the vehicle control interfaces for respective safety-critical control systems 150, 160, 170 are not illustrated and that various interfaces may be utilized to provide manual and self-drive operations of the vehicle 120. The DVI 180 further facilitates the control system 126 to provide driver feedback. The driver feedback can include the maneuver control that was determined by the control system 126. The driver feedback can further include a deviation detected between the maneuver control that was determined and a maneuver performed by the driver.

The communication system 128 may be operable to receive information from off-board systems that provide information to the control algorithms that include, but are not limited to, traffic information, weather information, location information and other such information that may facilitate control and navigation of the vehicle 120. The control algorithms are operable to provide maneuver control of the vehicle 120 in accordance with, for example, a range of vehicle automation that has been classified by agencies such as the National Highway Traffic Safety Administration (NHTSA) and SAE International from Automation Level 0 to Automation Level 5.

It should be appreciated that although the above automation levels are utilized for descriptive purposes herein, other delineations may additionally or alternatively be provided. However, the complexity of even the automation levels described herein may result in an unclear demarcation of operating boundaries and driver interaction responsibilities. In the description herein "Level 3" is used to represent partial automation levels such as Levels 1-3, and Level 4 is used to represent high automation levels such as Levels 4-5.

An off-board computer system 190 can be a computer server or any other computing system that is separate from the control system 126 that is 'on-board' the vehicle 120. The off-board computer system 190 can be more powerful compared to the control system 126, for example, have a faster processor, have more memory, have additional computing resources such as a graphical programming unit (GPU), an artificial neural network (ANN) chip, and the like.

Typically, new/inexperienced drivers, and/or reckless/bad drivers cause vehicle accidents. It is desirable to train the drivers to mitigate risks of accidents. The technical solutions described herein provide techniques to assist and improve driving performance by communicating driving suggestions through haptic, audio, and visual cues to mitigate accidents and improve driving performance of the driver. The technical solutions described herein facilitate the automated driving system 122 to dynamically provide driver feedback for driver performance improvement.

Figure 2:
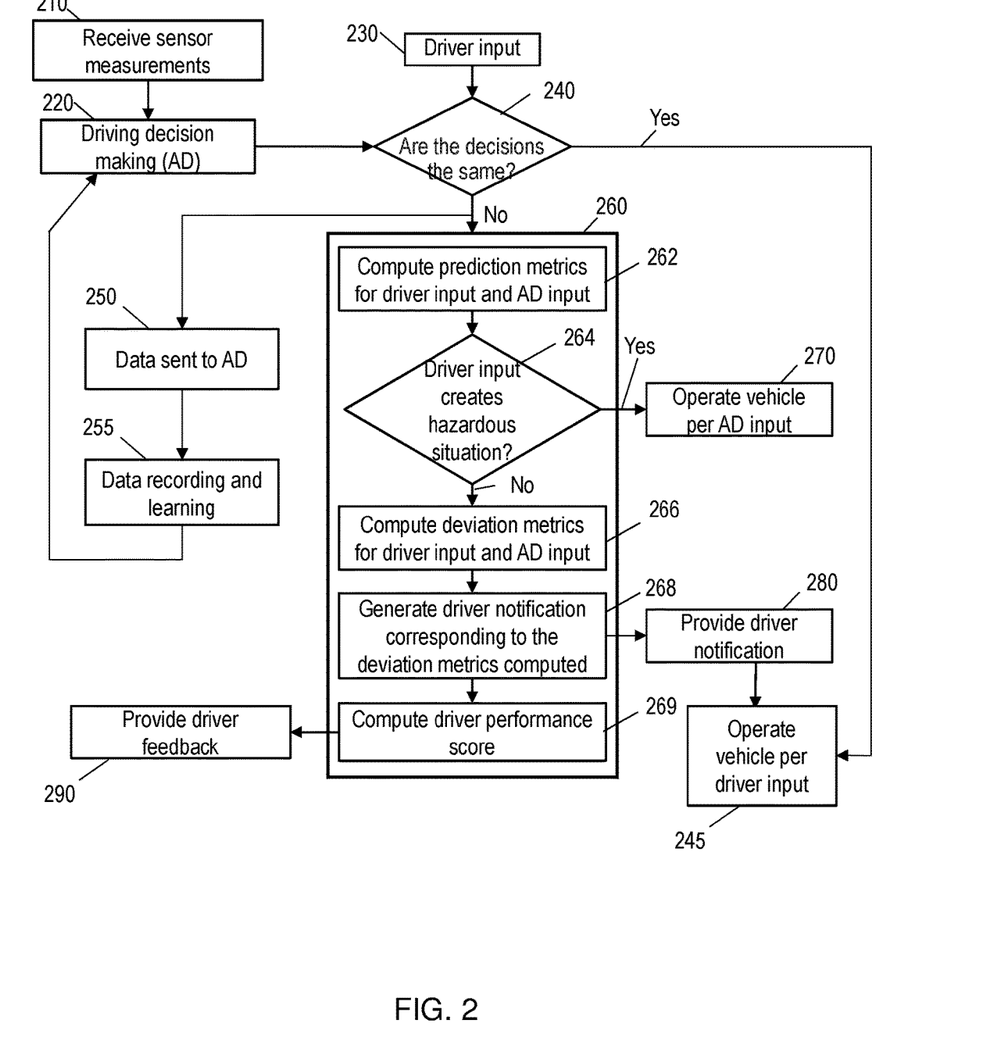
FIG. 2 depicts a flowchart of an example method for providing driver feedback according to one or more embodiments.

FIG. 2 depicts a flowchart of an example method 200 for providing driver feedback according to one or more embodiments. The method may be executed by the control system 126, in one or more examples. In one or more examples, the method may be executed by executing one or more computer executable instructions that are stored on a computer readable storage device. The method includes receiving one or more sensor measurements, at 210. The sensor measurements can include measurements from one or more on-board and/or off-board measurement systems. For example, measurements may be received via the sensors 124, and or via a vehicle-to-vehicle communication (V2X) system. The measurements may be received in a wired/wireless manner. The measurements can include a location of the vehicle 120, a distance from an object (including another vehicle) within a predetermined vicinity, an estimated time of collision with the object, a vehicle speed, a vehicle steering direction, a vehicle acceleration/deceleration, and any other such sensor measurements.

The method further includes determining a first maneuver control for the vehicle 120 based on the sensor measurements received, at 220. The automated driving system 122 determines the maneuver control using the one or more control algorithms that are known techniques. The first maneuver control includes a first vehicle speed, a first vehicle acceleration, a first vehicle steering direction, and other such maneuver parameters to control the operation of the vehicle 120.

The method further includes receiving a second maneuver control as part of a driver input, at 230. The second maneuver control includes a second vehicle speed, a second vehicle acceleration, a second vehicle steering direction, and other such maneuver parameters to control the operation of the vehicle 120.

The method includes comparing the two maneuver controls to determine if they are substantially the same, at 240. The two maneuver controls are determined to be substantially same if each of the one or more parameter values included in the maneuver controls are within a predetermined threshold of each other. If the two maneuver controls are substantially the same, the operation of the vehicle 120 is performed according to the second maneuver control received from the driver, at 245.

Alternatively, if the first maneuver control and the second maneuver control are substantially different, (not substantially the same) the method includes sending the two maneuver controls to the automated driving system 122, in one or more examples, at 250. The automated driving system 122 is updated based on the second maneuver control to customize the automated driving system 122 according to the driver of the vehicle 120, at 255. In one or more examples, the one or more control algorithms that are used by the automated driving system 122 are updated in this manner. In one or more examples, the control algorithms are in the remote server 190. In one or more examples, the updates are performed to the control algorithms that are associated with a profile associated with the driver. The association may be based on an identifier of the driver, such as a username/password, biometric identifier, an electronic keyfob, a smartphone, or any other such identifier. Alternatively, or in addition, the updates are performed to the control algorithms that are associated with the vehicle 120, such as a license plate number, a vehicle identification number, and the like.

Further, the method includes generating a driver feedback notification, at 260. The driver feedback notification is generated based on determining driving prediction metrics between the first maneuver control and the second maneuver control, at 262. The prediction metrics are based on the one or more parameters of each maneuver control. For example, the automated driving system 122 determines one or more of the following based on the two maneuver controls: below/above speed limit, acceleration/deceleration, lane following, lane change, tailgating distance, compliance with traffic conventions, and the like. The automated driving system 122 predicts the one or more metrics from the above list if the first maneuver control from the driver input is applied to operate the vehicle 120, and when using the first control maneuver from the automated driving system 122.

Based on the predictions for the vehicle operation using the driver input, the automated driver system 122 determines if the driver input creates a hazardous situation, at 264. For example, the automated driver system 122 determines if a hazardous situation is created based on a predicted time of collision being below a predetermined threshold. Alternatively, or in addition, the hazardous situation may be based on the acceleration being above an acceleration threshold. Alternatively, or in addition, if the vehicle speed is above a speed threshold, a hazardous situation may be deemed. Alternatively, or in addition, if the predicted tailgating distance is below a tailgating threshold, the automated driving system 122 may determine a hazardous situation. It is understood that the above are just a few examples and that a hazardous situation may be predicted based on various other parameters and/or a combination thereof. If the automated driving system 122 predicts a hazardous situation because of the driver input, the automated driving system operates the vehicle 120 according to the input from the first maneuver control from the automated driving system 122, at 270.

If no hazardous situation is predicted, the method further includes determining driving deviation metrics between the first maneuver control and the second maneuver control, at 266. For example, the automated driving system 122 determines a difference in one or more of the prediction metrics for the driver input and the input from the automated driving system 122. In other words, differences between the two predicted sets of metrics are computed as the deviation metrics. For example, the vehicle speeds, vehicle acceleration, and vehicle steering direction values in the two maneuver controls are compared and respective differences are computed. Further, a driver notification is generated corresponding to the computed deviation metrics, at 268 (see FIG. 3). The notification can be a combination of visual, audio, and haptic feedback provided to the driver.

The generated notification is provided to the driver via the one or more components of the DVI 180 as described herein, at 280. Further, the vehicle is operated as per the driver input, at 245.

In one or more examples, the method also includes computing a driver performance score, at 269. The driver performance score can be based on a predetermined model that takes into account the one or more deviations metrics. For example, the score can be a weighted sum of the deviation metrics:

$$Score = \sum_{i=0}^{n} w_i x_i$$

Here, n is the number of deviation metrics, $x_i$ is an $i^{th}$ deviation metric and $w_i$ is a weight that is assigned to the $i^{th}$ deviation metric. It is understood that any other model can be used to compute the driver performance score. The driver performance score is provided to the driver and/or other parties, at 290. For example, the driver performance score is displayed via the DVI 180 as a real-time indicator or as an end of trip summary. Alternatively, or in addition, the driver performance score is stored in the remote server 190 associated with the identifier of the driver.

Figure 3:
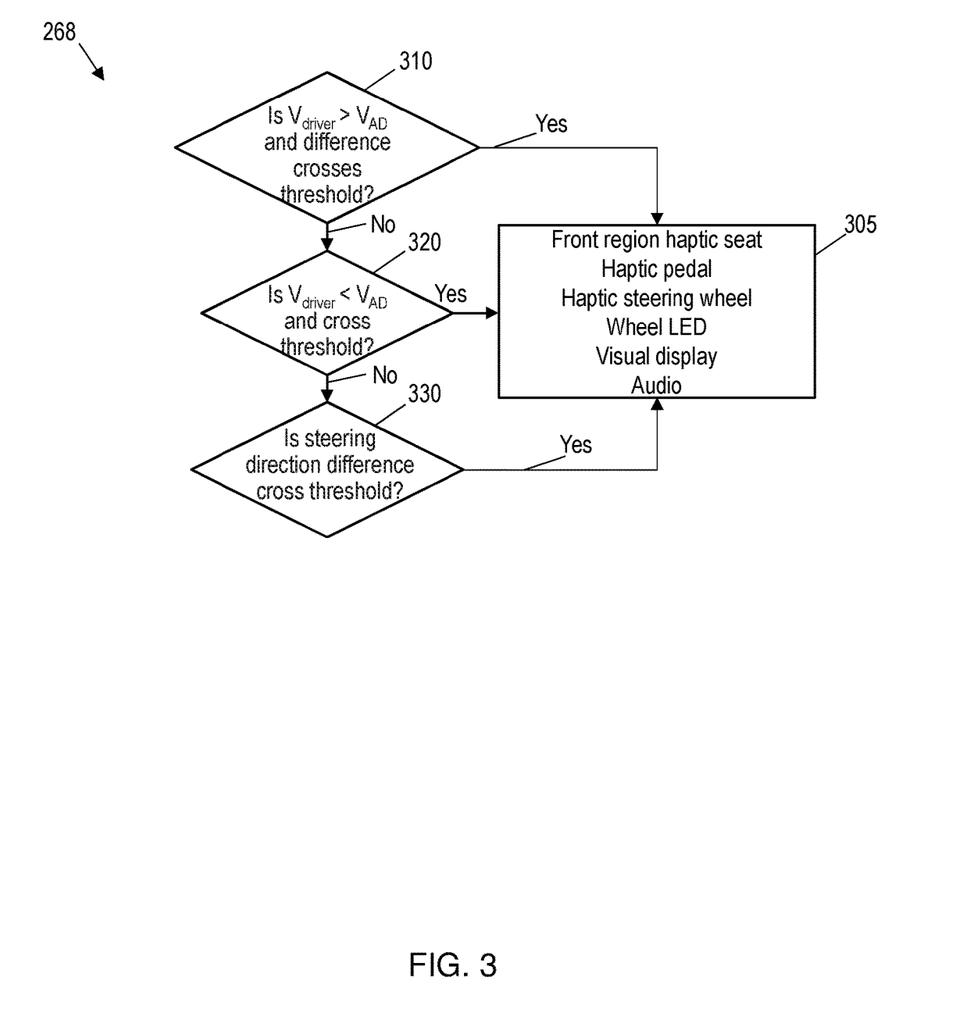
FIG. 3 depicts a flowchart for a method of generating the driver notification based on the computed driver metrics according to one or more embodiments.

FIG. 3 depicts a flowchart for a method of generating the driver notification (268) based on the computed driver metrics according to one or more embodiments. The method includes comparing a vehicle speed (V) based on the first control maneuver ($V_{AD}$) and based on the second control maneuver ($V_{driver}$) to check if $V_{driver} > V_{AD}$ and whether the difference crosses a predetermined threshold (such as 5 MPH, 3 MPH, 10 MPH, or any other), at 310. If the condition is true, a driver notification is generated, at 305; otherwise, the method includes checking if a second condition of $V_{driver} < V_{AD}$ and whether the difference crosses the predetermined threshold, at 320. If the second condition is true, the driver notification is generated, at 305; otherwise the method includes checking if a third condition of a difference in steering direction between the two maneuvers crosses a predetermined threshold (5 degrees, 3 degrees, 10 degrees etc.), at 330. For example, if the first steering direction from the first maneuver control (automated) exceeds the second steering direction from the second maneuver control (driver) by the predetermined threshold, the method includes generating the notification, at 305.

The notification generated is to guide the driver to maneuver the vehicle according to the suggested first maneuver control from the automated driving system 122. Accordingly, the notification provides cues to instruct the driver if the driving difference crosses the respective parameter thresholds. For example, consider a case in which the vehicle 120 is approaching a stop light (traffic light), which is 'red' indicating the vehicle 120 to stop. The automated driving system 122 using the technical solutions described herein (FIG. 2) determines whether the driver is following a velocity glide slope to safely and efficiently stop at the light in time. The reference velocity glide slope is calculated by the automated driving system (first maneuver control). The actual input from the driver is compared with the reference glide slope and the difference, if any, is notified to the driver.

Figure 4A:
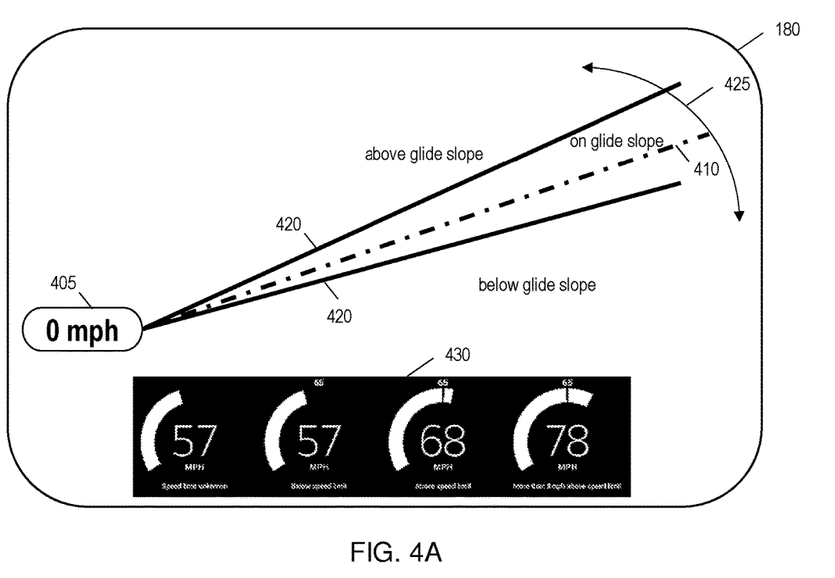
FIG. 4A depicts an example notification provided to a driver according to one or more embodiments.

FIG. 4A depicts an example notification provided to a driver according to one or more embodiments. The notification includes one or more visual notifications depicted in FIG. 4A. Consider the case where the suggested vehicle speed, i.e. first vehicle speed 405 from the first control maneuver from the automated driving system 122 is 0 MPH. Accordingly, the automated driving system 122 computes a first glide slope 410 that represents the first deceleration from the first maneuver control for the vehicle 120. The first deceleration is determined based on the current vehicle speed to reach the first vehicle speed 405 given the predicted time of collision with a remote object or a location to stop because of a stop sign, traffic light, etc. The DVI 180 displays the computed glide slope 410. Further, based on the driver input, a second glide slope 420 is computed using the second deceleration from the second maneuver control. The second glide slope 420 can be above or below the first glide slope 410 based on driver input to the brake pedal. In one or more examples, the DVI 180 displays the second glide slope 420 along with a curve 425 representing a difference in the suggested glide slope 410 from the automated driving system and the actual glide slope 420 based on the driver's input.

The visual notification can further include a speed limit compliance display 430. It should be noted that FIG. 4 depicts different examples of the speed limit compliance display 430, where the current vehicle speed from the second maneuver control is displayed along with a speed limit on the road that the vehicle 120 is traveling. Further, the speed limit compliance display 430 indicates how much below/above the speed limit the current vehicle speed is.

In one or more examples, the visual notifications described herein are accompanied with audio notifications via the speakers of the DVI 180. For example, if the speed limit is exceeded by a predetermined threshold, the DVI 180 can provide an audible warning such as a beep, a spoken warning, and the like. The presented auditory cues could also be adapted in terms of frequency, duty cycle or intensity to indicate the detected deviation level.

In one or more examples, the audio/visual notification can vary based on a magnitude of the difference computed between the parameters from the first maneuver control and the second maneuver control. For example, the color of the second glide slope 420 and/or the curve 425 representing the variance between the first glide slope 410 and the second glide slope 420 can change based on the difference between the two glide slopes (410, 420). For example, the color may be green (or any other first color) if the difference is below a predetermined threshold and red (or any other second color) if the difference exceeds the predetermined threshold.

Figure 4B:
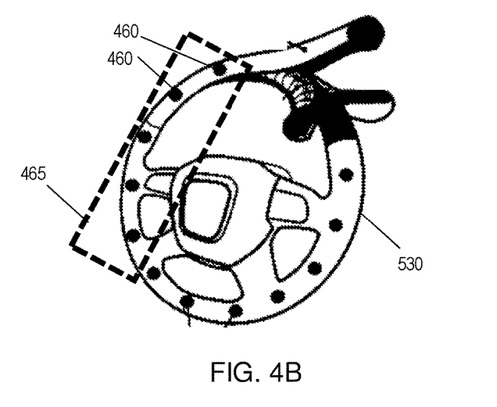
FIG. 4B depicts an example notification provided to a driver according to one or more embodiments.

FIG. 4B depicts an example notification provided to a driver according to one or more embodiments. The notification includes one or more visual notifications depicted in FIG. 4B. The visual notification, alternatively or in addition to the display notifications via the DVI 180, can further include using one or more light emitting diodes (LEDs) 460 embedded in the steering wheel 530. In one or more examples, the steering wheel LEDs 460 are used to indicate lane following. For example, if the vehicle 120 is being driven too close to the left lane markers, the left side of the steering wheel 530 is illuminated by activating a subset 465 of the LEDs 460 that are on the left side of the steering wheel 530; if the vehicle is substantially in the center of the lane, the top center of the steering wheel 530 is illuminated. Further, in one or more examples, the light of the LEDs 460 is varied based on the type/magnitude of the notification being provided. For example, the LEDs 460 may be illuminated green (or any first color) if the vehicle 120 is in the center of the lane whereas they may be illuminated yellow (or any other second color) to warn about the vehicle being too close to the left lane markers.

In one or more examples, if the vehicle 120 is backing up too fast a bottom portion of the steering wheel 530 is illuminated. Alternatively, or in addition, if the vehicle 120 performs a dangerous lane change a corresponding quadrant of the steering wheel 530 is illuminated indicating unsafe maneuver. A dangerous lane change is determined based on a distance between the vehicle 120 and one or more remote vehicles in a second lane into which the vehicle 120 moves into from a first lane in which the vehicle 120 is presently traveling. In addition, the vehicle speed, vehicle acceleration are also used. Alternatively, or in addition, if the vehicle 120 makes an abrupt turn an alert is provided by scrolling ab illumination of the LEDs 460 in the detected direction.

In one or more examples, the LEDs 460 in the steering wheel 530 form a 360 degree display to facilitate the steering wheel 530 to be used as an awareness device. In one or more examples, the steering wheel 530 has any other type of 360 degree display embedded that facilitates the steering wheel 530 to be used as an awareness device to provide the one or more visual notifications.

It is understood that notifications can be provided in scenarios other than the example scenarios described herein. It is also understood that different/additional notifications from those noted herein can be provided for example scenarios described herein.

Figure 5:
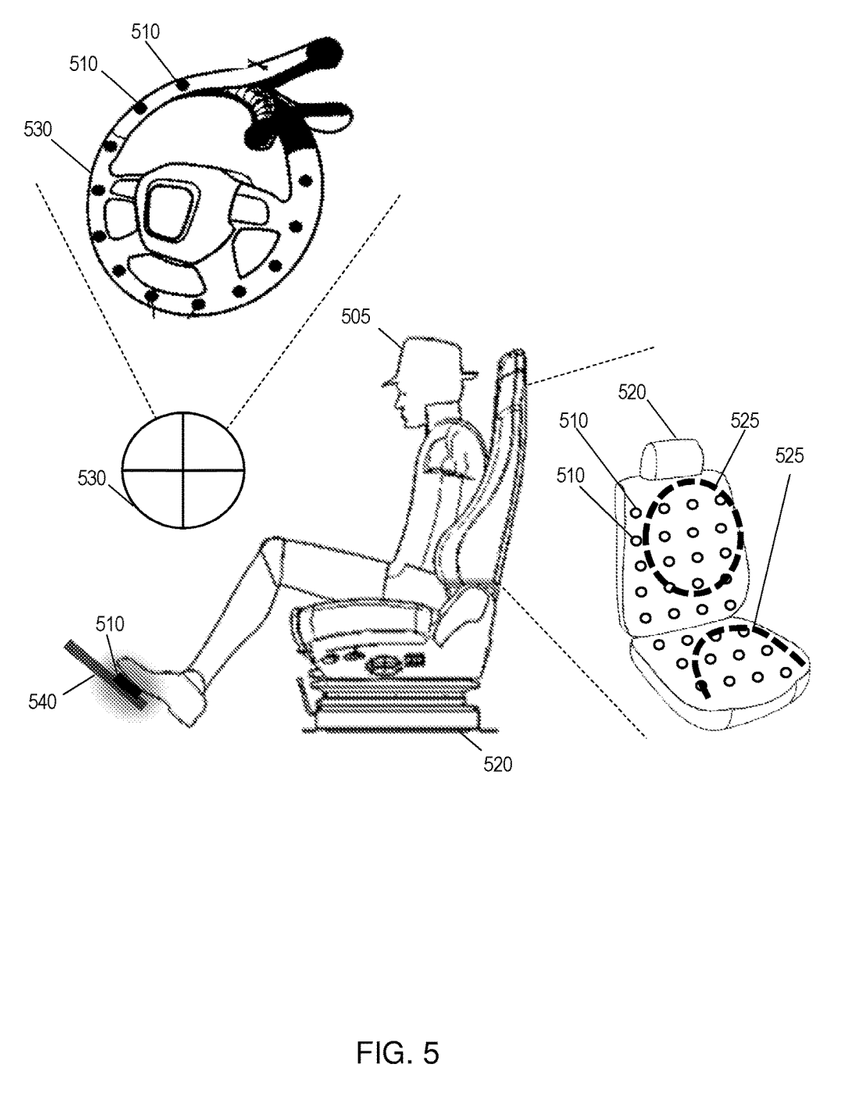
FIG. 5 depicts an example notification provided to a driver according to one or more embodiments.

FIG. 5 depicts an example notification provided to a driver according to one or more embodiments. The notification includes one or more haptic notifications that can be provided via one or more haptic actuators 510. The actuators may be embedded in a seat assembly 520, in a steering wheel 530, in a pedal 540 (gas/brake/clutch) and other such vehicle interface components to provide a haptic feedback to the driver 505. The intensity or duty cycle of the haptic feedback is adjusted according to the magnitude of the difference. The intensity of the haptic feedback can be adjusted by adjusting an amplitude and/or frequency of a vibration provided by the one or more actuators 510. For example, the haptic alert may provide a strong vibration for excessive acceleration and an advisory alert (light vibration) for traveling too slowly. Here, the strong vibration is provided using a higher intensity haptic feedback compared to the intensity used for the light vibration. The duty cycle of the haptic feedback may be adjusted by varying the on time and off time parameters. As an example, the duty cycle can be increased as a way to convey an increased level of deviation. Alternatively, the duty cycle can be used to construct unique haptic patterns that indicate multiple types of conditions using a single modality, e.g., a deviation has occurred or there is a warning event.

Figure 6A:
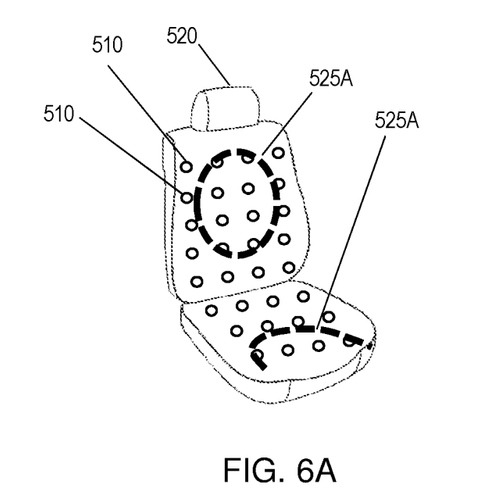
FIG. 6A depicts an example notification provided to a driver according to one or more embodiments.
Figure 6B:
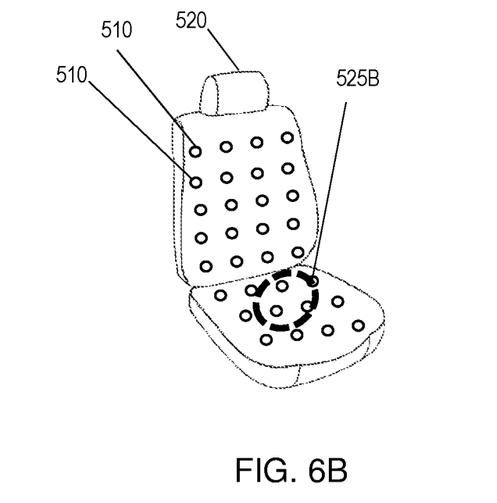
FIG. 6B depicts an example notification provided to a driver according to one or more embodiments.
Figure 6C:
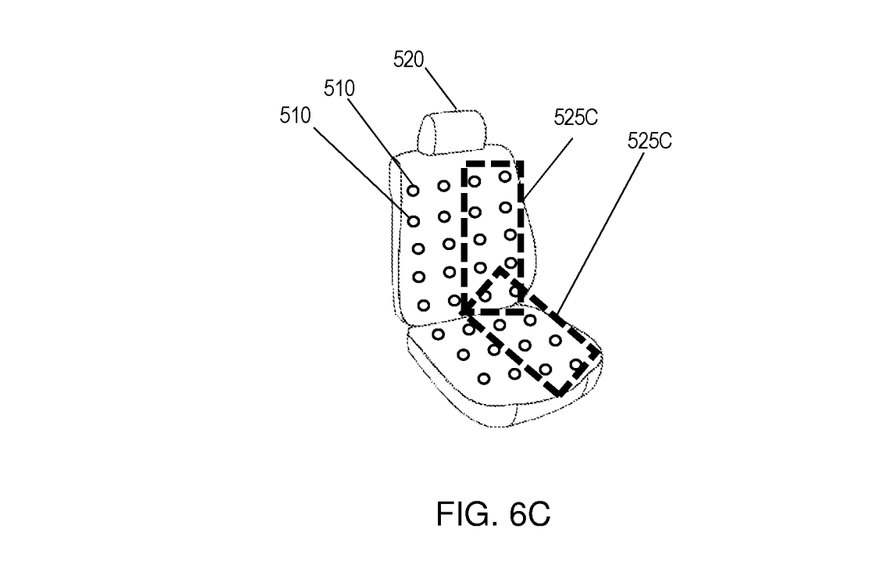
FIG. 6C depicts an example notification provided to a driver according to one or more embodiments.

Further, the haptic feedback is provided using different subsets 525 of the actuators, in one or more examples. FIG. 6A depicts actuator subsets 525A used for providing a haptic notification regarding acceleration. In addition, the haptic alert may provide a strong vibration for excessive acceleration and an advisory alert (light vibration) for traveling too slowly via the actuator subset 525. FIG. 6B depicts a different actuator subset 525B being used to provide a haptic notification regarding braking, for example, a strong vibration for excessive brake application and a light vibration if inadequate braking is detected. FIG. 6C depicts an actuator set 525C providing a directional haptic notification. For example, the directional notification is indicative when the haptic alert is in the direction of the lane deviation to train the driver 505 to drive in the center of the lane. For example, the driver 505 may typically center the vehicle 120 too far toward the left side of the lane. In such cases, the lane keeping assistance provided by the automated driving system 122 provides the directional torque from the left side haptic actuators to indicate that the driver 505 should steer the vehicle 120 to the right.

Additionally, referring back to FIG. 5, the haptic notifications described are provided using the actuators 510 in the steering wheel 530 in addition to those from the actuators in the seat assembly 520. The actuators in the steering wheel 530 are grouped into one or more subsets similar to those in the seat assembly and different subsets are activated to provide the different types of feedback, acceleration, braking, directional feedback etc.

Further yet, in one or more examples, the notification includes a torque being applied via the steering wheel 530. For example, in the above example where the driver 505 moves the vehicle 120 to the left lane marker of the traveling lane, the steering wheel 530 applies torque in opposition direction on the steering wheel 530.

The notification can include a combination of the audio/visual and haptic notifications. For example, in case an excessive acceleration is detected, the notification to the driver 505 can include illuminating a top portion of the steering wheel LEDs 460; activating a bottom front region haptics of the seat 520; a continuous buzz on the accelerator pedal 540; an HUD/center stack display indicative of the excessive acceleration information; and an audio indicative of the suggested maneuver. It is understood that in other examples, the notification can include a different combination of the notifications.

The technical solutions described herein accordingly facilitate to assist and improve driving performance by communicating driving suggestions from an automated driving system through haptic, audio and visual cues to reduce accidents and improve driving performance in the long run. The technical solutions described herein accordingly improve driving performance of a new/unexperienced/bad/reckless drivers, which is one of the primary causes of driving accidents. As described herein, the technical solutions utilize vehicle driving automation feature (level1 and above) for driver performance improvement when driving automation features are not active. The driver performance is improved by communicating driving suggestions through one or a combination of haptic seat/pedals, steering wheel LEDs and haptics, audio, and visual cues when driver behavior differs from the decisions of the automated driving system. In one or more examples, the vehicle automated driving system can be updated/improved based on the driving data of the driver.

The technical solutions described herein provide audio/visual and haptic cues to instruct the driver in case a driving difference is detected when comparing driver input to an automated driving system decisions, particularly when the detected difference(s) crosses a threshold. The technical solutions described herein accordingly use the automated driving system to train inexperienced drivers and to characterize their driving performance for instruction purposes. One or a combination of the following could be used to indicate various types of driver performance issues: steering wheel (LEDs, haptics, resistance); haptic seat (direction, intensity, pattern); haptic pedals (buzz, short pulses); visual cues (HUD, center stack, etc.); and audio.

The one or more notifications provided are accompanied by visual explanations, for example, on a console, overhead display or any other display unit in the vehicle 120.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for providing a driver performance feedback to a driver of a vehicle, the method comprising:
   receiving, by a controller, a first maneuver control from an automated driving system of the vehicle;
   receiving, by the controller, a second maneuver control from the driver;
   in response to the first maneuver control being different from the second maneuver control:
      generating a driver notification that is indicative of the first maneuver control from the automated driving system; and
      operating the vehicle using the second maneuver control;
   computing, by the controller, a set of deviation metrics by determining differences between one or more parameters from the first maneuver control and one or more parameters from the second maneuver control; and
   generating the driver notification based on the deviation metrics.

2. The method of claim 1, wherein the first maneuver control is different from the second maneuver control if a difference between a first vehicle speed from the first maneuver control and a second vehicle speed from the second maneuver control exceeds a predetermined threshold.

3. The method of claim 1, wherein the first maneuver control is different from the second maneuver control if a difference between a first vehicle acceleration from the first maneuver control and a second vehicle acceleration from the second maneuver control exceeds a predetermined threshold.

4. The method of claim 1, wherein the first maneuver control is different from the second maneuver control if a difference between a first vehicle steering-direction from the first maneuver control and a second vehicle steering-direction from the second maneuver control exceeds a predetermined threshold.

5. The method of claim 1, further comprising: computing a driver performance score for the driver wherein the driver performance score is computed as $$score = \sum_{i=1}^{n} w_i x_i,$$

where $x_i$ is the $i^{th}$ deviation metric from the set of deviation metrics, $w_i$ is a weight associated with the $i^{th}$ deviation metric, and n is a total number of deviation metrics.

6. The method of claim 1, further comprising:
determining, by the controller, if the second maneuver control creates a hazardous situation based on a predetermined set of parameters; and
in response to the hazardous situation being created, operating the vehicle according to the first maneuver control that is received from the automated driving system.

7. The method of claim 1, further comprising:
updating one or more control parameters of the automated driving system based on the second maneuver control that is received from the driver.

8. A system comprising:
an automated driving system;
a driver vehicle interface system; and
a controller coupled with the driver vehicle interface system and the automated driving system, the controller configured to provide driver performance feedback for a driver of a vehicle, wherein providing the driver performance feedback comprises:
receiving a first maneuver control from an automated driving system of the vehicle;
receiving a second maneuver control from the driver;
in response to the first maneuver control being different from the second maneuver control:
generating a driver notification that is indicative of the first maneuver control from the automated driving system; and
operating the vehicle using the second maneuver control;
computing, by the controller, a set of deviation metrics by determining differences between one or more parameters from the first maneuver control and the one or more parameters from the second maneuver control; and
generating the driver notification based on the deviation metrics.

9. The system of claim 8, wherein the first maneuver control is different from the second maneuver control if a difference between a first vehicle speed from the first maneuver control and a second vehicle speed from the second maneuver control exceeds a predetermined threshold.

10. The system of claim 8, wherein the first maneuver control is different from the second maneuver control if a difference between a first vehicle acceleration from the first maneuver control and a second vehicle acceleration from the second maneuver control exceeds a predetermined threshold.

11. The system of claim 8, wherein the first maneuver control is different from the second maneuver control if a difference between a first vehicle steering-direction from the first maneuver control and a second vehicle steering-direction from the second maneuver control exceeds a predetermined threshold.

12. The system of claim 8, wherein providing the driver performance feedback further comprises: computing a driver performance score for the driver wherein the driver performance score is computed as $$score = \sum_{i=1}^{n} w_i x_i,$$

where $x_i$ is an $i^{th}$ deviation metric from the set of deviation metrics, $w_i$ is a weight associated with the $i^{th}$ deviation metric, and n is a total number of deviation metrics.

13. The system of claim 8, wherein providing the driver performance feedback further comprises:
determining if the second maneuver control creates a hazardous situation based on a predetermined set of parameters; and
in response to the hazardous situation being created, operating the vehicle according to the first maneuver control that is received from the automated driving system.

14. A computer program product comprising a computer readable storage device comprising one or more computer executable instructions, which, when executed by a controller cause the controller to provide driver performance feedback for a driver of a vehicle, wherein providing the driver performance feedback comprises:
receiving, by a controller, a first maneuver control from an automated driving system of the vehicle;
receiving, by the controller, a second maneuver control from the driver; and
in response to the first maneuver control being different from the second maneuver control:
generating a driver notification that is indicative of the first maneuver control from the automated driving system; and
operating the vehicle using the second maneuver control;
computing, by the controller, a set of deviation metrics by determining differences between one or more parameters from the first maneuver control and the one or more parameters from the second maneuver control; and
generating the driver notification based on the deviation metrics.

15. The computer program product of claim 14, wherein the first maneuver control is different from the second maneuver control if a difference between a first vehicle speed from the first maneuver control and a second vehicle speed from the second maneuver control exceeds a predetermined threshold.

16. The computer program product of claim 14, wherein the first maneuver control is different from the second maneuver control if a difference between a first vehicle steering-direction from the first maneuver control and a second vehicle steering-direction from the second maneuver control exceeds a predetermined threshold.

17. The computer program product of claim 14, wherein providing the driver performance feedback further comprises:
determining if the second maneuver control creates a hazardous situation based on a predetermined set of parameters; and
in response to the hazardous situation being created, operating the vehicle according to the first maneuver control that is received from the automated driving system.

* * * * *